United States Defensive Publication [19] (H) [11] T995,006

Farmer et al. [43] Jun. 3, 1980

[54] METHOD OF REMOVAL OF BORON FROM AQUEOUS SOLUTIONS

[75] Inventors: John B. Farmer, Chessington; John A. Kydd, Surbiton, both of England

[73] Assignee: United States Borax Chemical Corporation, Los Angeles, Calif.

[21] Appl. No.: 64,328

[22] Filed: Aug. 6, 1979

[30] Foreign Application Priority Data

Apr. 25, 1979 [GB] United Kingdom ..... 14374/79

[51] Int. Cl.[2] ..... C01B 35/12

[52] U.S. Cl. ..... 423/279; 23/301

[57] ABSTRACT

Boron is removed from aqueous solutions by heating the solution to 60°-100° C. and adding a calcium compound such as lime to form a precipitate of calcium borate which is separated such as by filtration. Improved results are obtained by using other calcium salts such as calcium chloride in combination with lime. For solutions initially containing less than 100 ppm boron, calcium borate seed crystals are introduced.

10 Claims, No Sheets Drawing,

12 Pages Specification

The file of this unexamined application may be inspected and copies thereof may be purchased (849 O.G. 1221, Apr. 9, 1968).